Dec. 19, 1967  C. D. FRISBY ETAL  3,359,410
AUTOMATIC BASE LINE DRIFT CORRECTOR CIRCUIT
Filed April 23, 1964  5 Sheets-Sheet 2

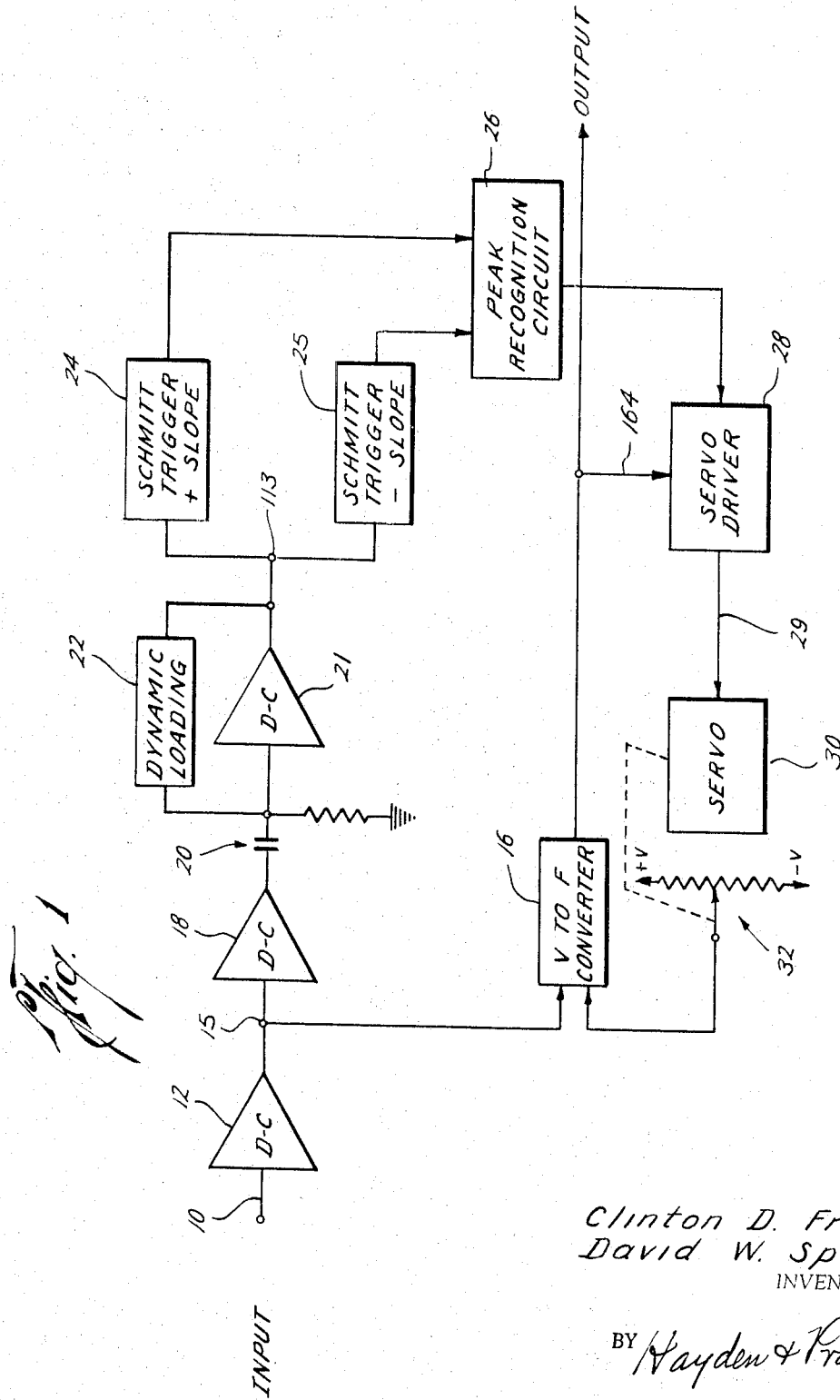

Clinton D. Frisby
David W. Spence
INVENTORS

BY Hayden + Pravel

ATTORNEYS

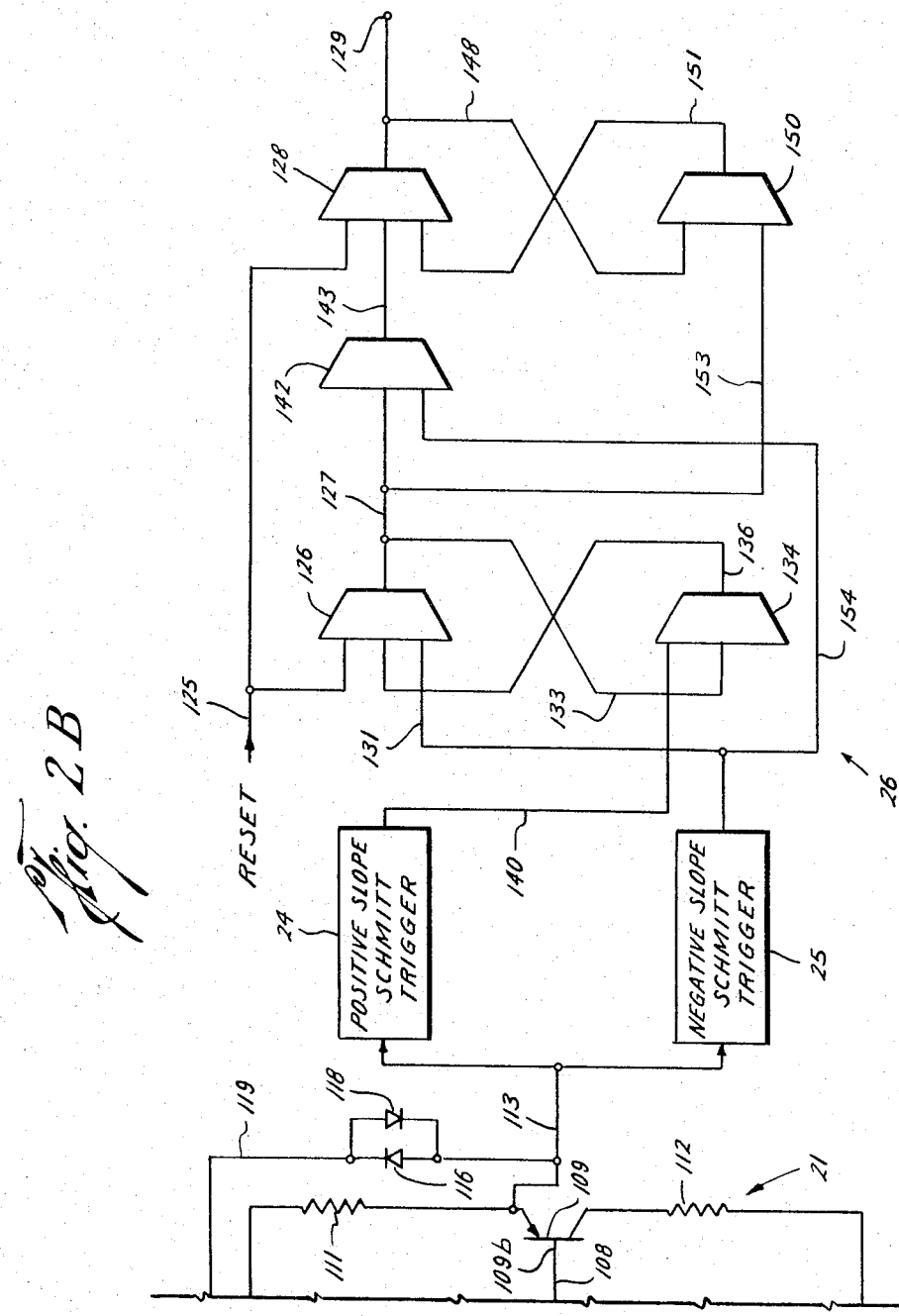

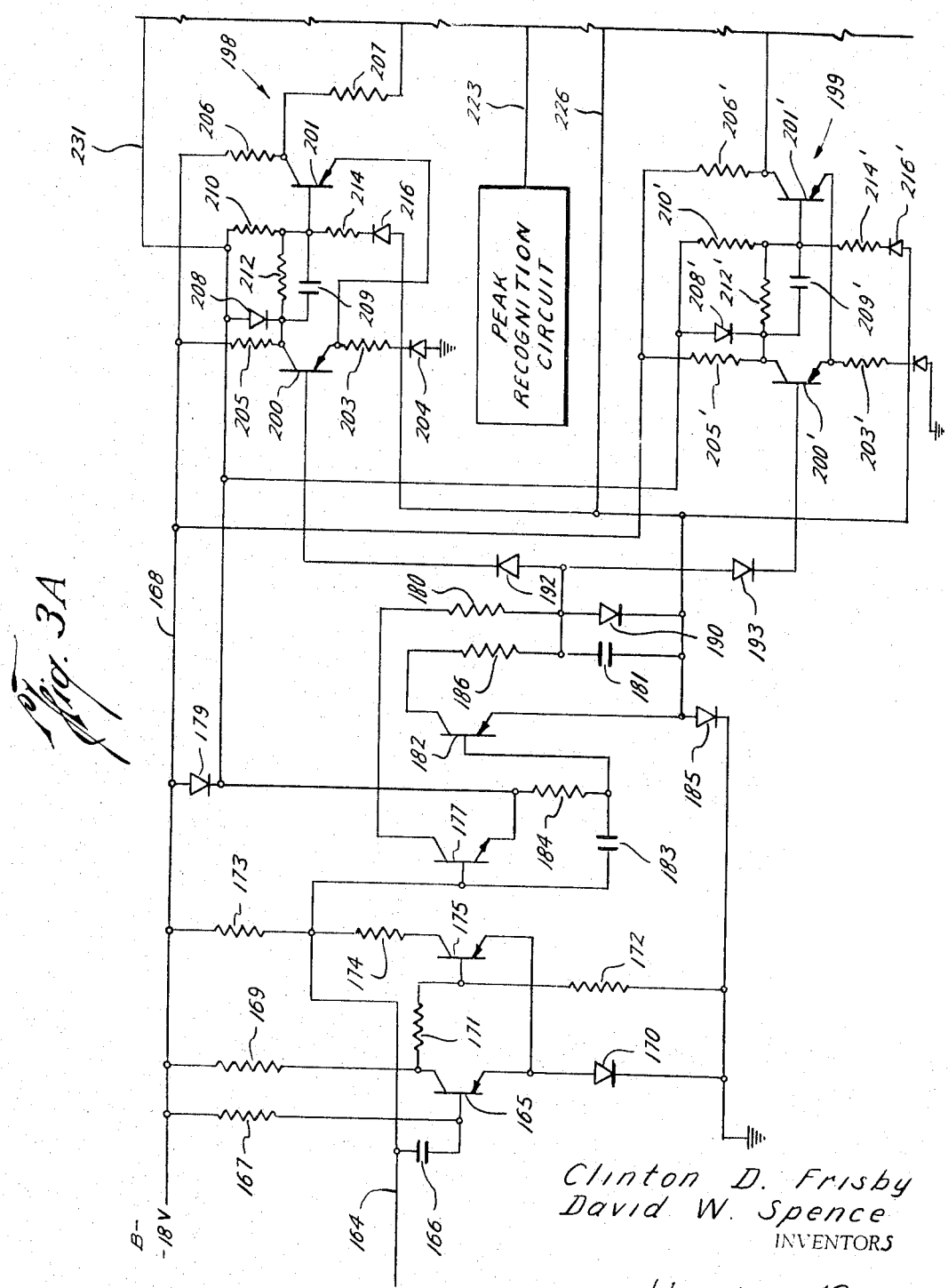

Clinton D. Frisby
David W. Spence
INVENTORS

United States Patent Office 3,359,410
Patented Dec. 19, 1967

3,359,410
AUTOMATIC BASE LINE DRIFT CORRECTOR
CIRCUIT
Clinton D. Frisby and David W. Spence, Houston, Tex.,
assignors to Infotronics Corp., a corporation of Texas
Filed Apr. 23, 1964, Ser. No. 361,970
17 Claims. (Cl. 235—183)

ABSTRACT OF THE DISCLOSURE

A circuit input terminal communicates an analytical signal to a differentiating circuit which is connected in turn to a dynamic loading circuit. Two Schmitt trigger circuits are connected to the loading circuit to indicate positive or negative slope in the analytical signal. A peak recognition circuit is connected to the output of the trigger circuits to correlate the outputs of the trigger circuis to indicate the presence of an analytical fluctuation in the signal. The input of a voltage-to-frequency converter is connected to the circuit input terminal and the output of the converter is connected to the input of a servo driver circuit which detects drift and forms a correction signal. A servo is connected to the output of the servo driver circuit to produce the appropriate correction voltage which is then connected to the input of the converter. The output of the peak recognition circuit is communicated to the servo driver to inhibit the correction action during the occurrence of an analytical fluctuation in the analytical signal.

---

This invention relates to an automatic base line drift corrector circuit and more particularly to a circuit adapted to receive an input voltage subject to analytical voltage fluctuations and further subject to base line drift between such fluctuations wherein the invention provides corrections for the base line drift without altering the wave shape or amplitude of the analytical fluctuations as they occur.

Analytical signals are generally defined as signals provided by various types of sensors which form an output voltage nearly equal to zero when the sensor detects no information and which form a variable output signal to indicate the occurrence of analytical phenomena. Such voltages are often unidirectional resulting from the fact that most analytical processes are irreversible, and the voltages provided by some sensors are exceedingly small. As an example, the analysis of an unknown gas in a chromatograph utilizes a technique of conducting an inert gas past a sensor which forms an output voltage in the microvolt or millivolt range. When a constituent of the unknown is carried past the sensor, the output voltage varies in relation to the constituent conducted past the sensor so that an analytical fluctuation in the output voltage is formed. An additional example lies in the operation of a mass spectroscope wherein the spectrum is scanned and zero output is signified by a very small voltage which is considered to be the base line of the signal.

Analytical signals are usually unidirectional voltages having base lines perhaps in the microvolt or millivolt ranges with the analytical fluctuations separated by variable intervals of time, and the frequencies contained in the signal are quite low. Quite often, frequencies are so low that high gain D-C amplifiers are required to provide operable voltage ranges for recording and reduction of the analytical data and for other similar reasons. It may be appreciated by those skilled in the art that it is very difficult to build an accurate D-C amplifier completely free of drift during operation over a relatively long period of time. Further, analytical sensors are also subject to drift with the drift being reflected as a variation in the level of the base line of the analytical signal. Because of the importance of obtaining analytical signals having a base line which is essentially drift free and for many other reasons, it has been found desirable to provide means for correcting base line drift.

Therefore, it is an object of this invention to provide a new and improved automatic base line drift corrector circuit which dynamically maintains a drift free base line for unidirectional signals.

An important object of this invention is to provide a new and improved drift corrector circuit for use with a signal source providing information in the form of voltage fluctuations extending above a base line generally associable with minimum information.

A principal object of this invention is to provide a new and improved automatic base line corrector circuit which dynamically compensates the base line values of a unidirectional signal to enable equipment operable in response to the base line to recognize the presence of information in the form of signals extending above the base line.

Still a further object of this invention is to provide a new and improved automatic base line drift corrector circuit which provides a desired base line among a plurality of voltage fluctuations without altering the wave form or amplitude of the fluctuations.

Yet another object of this invention is to provide a new and improved automatic base line drift corrector circuit operable from slope variations of a signal.

An additional object of this invention is to provide a new and improved automatic base line drift corrector circuit for use with a signal source forming random fluctuations above a base line level which recognizes positive slope, zero slope, and then negative slope in the fluctuations.

A further important object of this invention is to provide a new and improved automatic base line drift corrector circuit for use with analytical data in signal form which completely alleviates the problem of drift in D-C amplifying equipment normally required to provide adequate signal levels from analytical sensors.

Still another object of this invention is to provide a new and improved automatic base line drift corrector circuit utilizing an RC differentiating circuit having a dynamically variable time constant value for wide range operations.

Yet another object of this invention is to provide a new and improved automatic base line drift corrector circuit which is not susceptible to false triggering on power supply voltage surges, noise or other spurious signals.

One object of this invention is to provide a new and improved automatic base line drift corrector circuit which recognizes analytical information and rejects drift and noise.

A further object of this invention is to provide a new and improved automatic base line drift corrector circuit having RC time constants, low-pass frequency characteristics and low frequency gain to provide an accurate base line.

The preferred embodiment of this invention will be described hereinafter, together with other features thereof, and additional objects will become evident from such description.

The invention will be more readily understood from a reading of the following specification and by reference to the accompanying drawings forming a part thereof, wherein an example of the invention is shown, and wherein:

FIG. 1 is a schematic block diagram of the circuit of this invention;

Figure 2A:
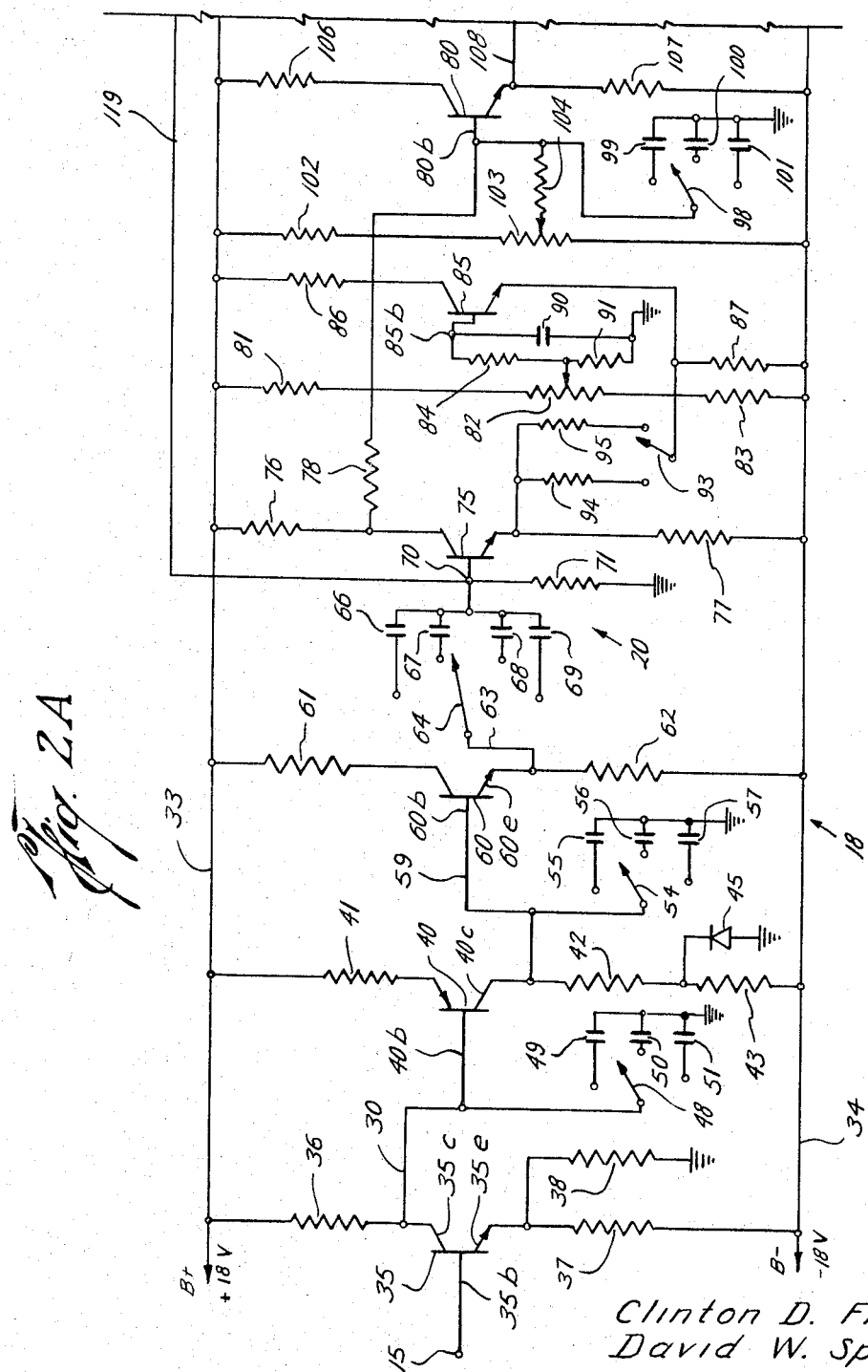
FIG. 2 (2A, 2B) is a schematic diagram of amplifying means, dynamically loaded slope detecting means, and logical circuitry operable in response to the slope of analytical data.

In FIG. 1 of the drawings, a conductor 10 is connected to an analytical sensor providing an output voltage having a base line subject to drift and forming voltage fluctuations representing analytical data occurring at various times. The conductor 10 is communicated with a D-C preamplifier 12 which provides a voltage in the range of about one volt to an input terminal 15. The input terminal provides an input voltage for a voltage-to-frequency converter 16 which forms an output signal of pulses having a frequency proportional to the input voltage from the terminal 15. Also, the input terminal 15 is connected to a D-C amplifier 18 which provides an input signal for a differentiating circuit indicated generally at 20. The differentiating circuit 20 is dynamically loaded by a D-C amplifier 21 having a feedback circuit 22 extending thereabout to form an output signal at a terminal 113 which operates a pair of Schmitt trigger circuits 24 and 25. The Schmitt trigger circuits 24 and 25 form output signals which are connected to a peak recognition circuit 26 which forms an input signal for a servo drive 28. The output of the converter 16 is supplied to the servo drive 28 which operates with the two above-mentioned inputs to form a signal in a conductor 29 communicated to a servo 30 which operates corrective signal generating means indicated generally at 32 which are responsive to the base line drift sensed in the servo driver 28 to form a correction signal which is input to the converter 16. The input to the converter 16 corrects the base line for drift without altering the wave shape or form of the analytical fluctuations extending above the base line which occur from time to time.

Considering the operation of the invention more in detail, the input terminal 15 is illustrated in FIG. 2A in D-C communication with the base 35b of an NPN transistor 35 having a collector load resistor 36 connected to the collector supply voltage in a conductor 33. Additionally, an emitter resistor 37 is connected to the B— voltage supplied by a conductor 34 and a parallel resistor 38 is connected from the emitter 35e to ground. Amplified voltages are taken from the transistor 35 by a conductor 30 directly connected to the base 40b of a PNP transistor 40 having an emitter resistor 41 connected to the conductor 33 and having a pair of series resistors 42 and 43 connected to the conductor 34. A Zener diode 45 is connected at its cathode to the collector circuit between resistors 42 and 43 to limit voltage fluctuations at that point.

The transistors 35 and 40 both amplify the input signal provided to the terminal 15 by conventional operation and include D-C coupling therebetween to amplify all frequencies extending in range toward zero frequency with high-frequency characteristics resulting from filtering means shunting higher frequencies to ground. More specifically, the collector 35c of the transistor 35 is connected by way of a switch 48 to one of three selected capacitors 49, 50 and 51 which are all connected to ground to alter the high-frequency gain characteristics of the amplification stage connected to the input terminal 15. Also, the collector 40c of the transistor 40 is connected to a switch 54 providing selection of three capacitors 55, 56 or 57 to form a variable capacitive shunt to ground for signals amplified by the transistor 40. It may be appreciated that the capacitive shunting selected by the switches 48 and 54 cooperates with the load resistances associated with the transistors 35 and 40, respectively, to form RC filtering circuits to thereby alter the high-frequency gain characteristics of the amplifier 18 which includes the first three amplification stages illustrated in FIG. 2A.

A conductor 59 is connected to the collector 40c of the transistor 40 and communicates directly with the base 60b of an NPN transistor 60 having a collector resistor 61 connected to the conductor 33 and having an emitter resistor 62 connected to the negative voltage in the conductor 34. The transistor 60 functions as an emitter follower with the output voltage taken from the emitter 60e by means of a conductor 63 which is directly connected to a switch 64.

The switch 64 provides a choice of ranges for the differentiating circuit indicated generally at 20 by selecting one of the capacitors 66, 67, 68, or 69. It may be appreciated that the capacitors 66, 67, 68 and 69 provide different amounts of capacitance to alter the RC time constant of the differentiating circuit indicated at 20. The capacitors are connected together at a terminal indicated generally at 70 and the terminal 70 is communicated to ground through a resistor 71 across which the differentiated signal is developed.

The terminal 70 is the input for the D-C amplifier indicated generally at 21 in the block diagram schematic of FIG. 1 and includes circuitry illustrated in FIG. 2A. A transistor 75 is connected to the differentiated signal provided at the terminal 70 and has a collector resistor 76 communicating with the B+ source 33 and an emitter resistor 77 which is connected to the negative voltage in the conductor 34. The amplified output of the transistor 75 is conducted by a series coupling resistor 78 directly to the base 80b of an NPN transistor 80.

Stabilization means for the amplifier 21 is connected to the emitter of the transistor 75. An adjustable voltage source is provided by the combination of three series resistors 81, 82 and 83 which are connected between the voltage supply lines 33 and 34. The resistor 82 is a variable resistor which supplies an adjustable voltage through a wiper arm connected to a resistor 84 connected to the base 85b of an NPN transistor 85. The transistor 85 is connected through its collector to the positive supply voltage line 33 by a resistor 86 and has an emitter resistor 87 connected to the negative supply voltage. The base 85b of the transistor 85 is grounded through a capacitor 90 and a resistor 91 cooperates serially with the resistor 84 to provide a path to ground parallel to the capacitor 90. The emitter voltage of the transistor 85 is supplied through a switch 93 to one of two series resistors 94 or 95 to the emitter of the transistor 75 to stabilize the transistor. The switch 93 controls the degree of interaction of the transistors 75 and 85 so that the gain of 75 is varied to permit discrimination against noise and other trivial fluctuations.

The output of the amplified signal on the collector of the transistor 75 is connected by the above-mentioned resistor 78 to the base 80b of the transistor 80 and is also connected to a switch 98 for selecting one of the capacitors 99, 100 or 101 for shunting high frequency A-C signals to ground. Thus, operation of the switch 98 provides an adjustable RC low-pass filter cooperating with the resistors 76, 78 and 104 of the transistor 75. Bias voltage provided to the base 80b of the transistor 80 is supplied by means of a resistor 102 connected to the voltage line 33 and a resistor 103 communicating the resistor 102 to the negative supply line 34. The resistor 103 is a potentiometer providing a variable voltage through a resistor 104 in connection with the base 80b of the transistor 80 to vary operation of that transistor. The transistor 80 includes a resistor 106 connected to the B+ voltage and an emitter resistor 107 connected to the supply line 34. The transistor 80 functions as an emitter follower with the output voltage taken off the emitter of the transistor by a conductor 108. Variable resistors 82 and 103 provide adjustments for setting zero output signal when the input signal rate-of-change is zero.

The conductor 108 illustrated in FIG. 2B is connected to the base 109b of a PNP transistor 109 having an emitter resistor 111 communicating with the positive voltage in the conductor 33 and a collector resistor 112 connected to the negative supply voltage in the conductor 34. The output signal is amplified in power capability by the transistor 109 and is connected to the output terminal 113.

The dynamic loading means 22 illustrated in the block diagram schematic of FIG. 1 is preferably a pair of paralleled semiconductor diodes 116 and 118 placed side-to-side and connected to the output terminal 113 for providing a feedback signal through a conductor 119 which is returned to the input terminal 70 of the amplifier designated generally at 21. In the operation of the amplifier 21, slope signals at the input terminal 70 are amplified linearly until the signals become sufficiently large to form a large output voltage at the terminal 113. Large voltages at the output terminal 113 are sufficient to cause conduction in either of the diodes 116 and 118 when the voltage at the terminal 113 overcomes the forward voltage drop characteristic of the particular diode. The net effect of the circuitry and the dynamic loading means connected around the amplifier 21 reduces the input impedance of the amplifier 21. The differentiating circuit 20 is operable for small changes is signal slope to have a time constant given by the resistor 71 cooperating with one of the selected capacitors 66 through 69. But, because of the logarithmic relation of voltage to conduction current characteristic of semiconductor diodes, it may be appreciated that the impedance viewed from the terminal 70 to A-C signals decreases as the slope of the A-C signals becomes larger in amplitude. Because of this, the circuitry effectively provides a dynamically variable resistance to ground parallel with the resistor 71 of the differentiating means 20 to thereby enable the differentiating means to accurately follow analytical signals after the initial detection of scope variation of said signals.

Considering now the voltage-to-frequency converter 16 illustrated in the block diagram schematic of FIG. 1, such device operates to accumulate current from the analytical wave form on one plate of a capacitor and removes precise quantities of charge from that capacitor whenever the charge on the capacitor exceeds the precise quantity. Removal of precise quantities of charge from the capacitor provides a trigger pulse for a pulse generator which forms an output pulse to thereby encode the current input in a train having an instantaneously variable frequency proportional to the current input of the converter 16. The preferred embodiment converter 16 is manufactured by the Vidar Corporation, model 211B.

To provide the automatic base line drift corrector circuit of this invention without altering or otherwise changing the wave shape or amplitude of analytical voltage fluctuations above the base line level, the invention utilizes means for recognizing voltage fluctuations in the peak recognition circuit 26.

That circuit is shown in greater detail in FIG. 2A where the terminal 113 supplies an input voltage to the Schmitt triggers 24 and 25. The positive slope Schmitt trigger 24 is operable on occurrence of voltages at the output terminal 113 of the amplifier 21 more negative than a certain negative amplitude and the negative slope Schmitt trigger is operable on occurrence of voltages above the certain amplitude from the terminal 113. In FIG. 2A, the terminal 113 is D-C coupled to the transistor 109 and when the amplifier 21 is in the quiescent state, it may be appreciated that the terminal 113 maintains a voltage level between the triggering voltages of the Schmitt triggers 24 and 25. On occurrence of positive slope, the voltage at the terminal 113 deflects to a voltage lower than the quiescent voltage maintained on the terminal 113 and the positive slope trigger 24 is operated to indicate the lower voltage. On the other hand, signals raising the voltage of the terminal 113 above the quiescent value are sensed by the negative slope Schmitt trigger 25 which functions similarly to the Schmitt trigger 24 to form an output pulse.

The Schmitt triggers 24 and 25 form output pulses connected to the peak recognition circuitry indicated generally at 26 in FIG. 1 which circuitry provides means recognizing the occurrence of analytical information in the signal applied to the input terminal 15. As an initial condition, the signal at the input terminal 15 has zero or negligible slope and the peak recognition means 26 is reset to place the circuitry of the peak recognition means in the following quiescent condition. It will be recognized by those skilled in the art that the logical circuitry of the peak recognition means 26 illustrated in FIG. 2B is best described in terms of voltage levels representing binary values of zero or one. The reset signal in the conductor 125 is sensed by a NOR gate 126 which forms a zero output signal in the conductor 127. Also, the reset conductor 125 is connected to a NOR gate 128 which forms a signal at the terminal 129 also having a value logically representing the zero level. The absence of slope in the analytical signal input to the terminal 15 is signified by the absence of output signals from the Schmitt triggers 24 and 25 so that zero signals are provided by both circuits with the zero signal from the negative slope Schmitt trigger 25 applied through a conductor 131 to the NOR gate 126. Recalling the initial condition left by the reset pulse applied through the conductor 125 in setting up operation of the automatic base line drift corrector of this invention, the one level signal input to the NOR gate 126 generated a zero level signal in the output conductor 127 which is transferred by the conductor 133 to an additional NOR gate 134. A zero at the input of the NOR gate 134 generates a one signal in its output conductor 136 which conductor communicates to the input of the NOR gate 126. The one signal in the conductor 136 continues to hold the NOR gate 126 output at zero after the reset pulse is applied thereto through the conductor 125. A pair of NOR gates 128 and 150 is also operated to obtain initial conditions providing an output signal of binary zero at the terminal 129. The NOR gate 128 is reset by the pulse in the conductor 125 and the conductor 143 also provides a one input to operate the gate and form a zero level signal at the terminal 129. The zero level signal at the terminal 129 is connected by a conductor 148 to a NOR gate 150 having an additional input on conductor 153 obtaining a zero level signal from the gate 126 so that the gate 150 operates to form a binary one output signal. The gate 150 is latched to the gate 128 by the conductor 151. Therefore, the reset pulse is unnecesary to operation of the invention because the pair of NOR gates 126 and 134 and the pair 128 and 150 operate as latches as long as the output voltage of the terminal 113 remains quiescent.

On the occurrence of an analytical voltage fluctuation in the signal input to the base line drift corrector of this invention, the peak is sensed by a fluctuation at the terminal 113 operating the positive slope Schmitt trigger 24 to form a signal having a logical value of one in a conductor 140 which is input to the NOR gate 134. It is to be noted that the quiescent conditions described hereinabove for the NOR gate 134 assumed a zero signal in a conductor 140 resulting from the initial conditions before the recognition of a peak. The one signal transferred by the conductor 140 to the NOR gate 134 generates a zero signal in the conductor 136 and, with zero signals in the conductor 125 and the conductor 131, the NOR gate 126 is operated to provide a one level signal in the conductor 127. The one signal is returned to the NOR gate 134 by the conductor 133 a maintain the gate in the altered state of operation maintaining a zero signal at the output. Initially, a NOR gate 142 connected to the conductor 127 maintains a one level output in a conductor 143 in response to the zero signal in the conductor 127. The occurrence of the positive slope detected by the Schmitt trigger 24 which forms the pulse in the conductor 140 alters the operated state of the NOR gate 142 to place a zero in the conductor 143 which is communicated as additional input to the NOR gate 128. The one signal in the conductor 153 operates the NOR gate 150 to form a binary zero signal at the output conductor 151. The presence of all zero inputs to the gate 128 causes the NOR gate to operate to the one level at the output terminal 129 which operation is also cross connected by the conductor 148 to the NOR gate 150 to provide a second one level input for the NOR gate 150 to maintain it at the zero output signal level.

With reference to FIGS. 1 and 2B, it may be appreciated that any analytical wave form having positive slope also passes through zero slope before the signal turns downwardly in returning to the base line level. Zero slope is detected by the differentiating means 20 which returns the voltage at the output terminal 113 of the dynamically loaded amplifying means 21 to the quiescent level and removes the binary one signal from the conductor 140 of the positive slope Schmitt trigger 24. The conductor 140 and the conductor 133 are the inputs for the NOR gate 134 and it may be appreciated that removal of either of the two binary one signals in either conductor does not alter the state of the NOR gate. Therefore, when the base line drift corrector circuit of this invention detects the zero slope level of an analytical wave form and operates the positive slope Schmitt trigger 24 to form a zero signal in the conductor 140, such operation does not alter the conductive state of any of the NOR gates in the peak recognition circuitry. This means that the output terminal 129 continues at the one level voltage signal.

When the analytical signal supplied to the input terminal 15 decreases from some elevated valve toward the base line valve of the signal, such deviation is sensed by the negative slope Schmitt trigger 25 which is triggered to form a binary one output signal in the conductors 131 and 154. The one signal in the conductor 131 operates the NOR gate 126 to provide a zero output signal which is transferred by the conductor 133 to the NOR gate 134. The NOR gate 134 is operated to form a one output while the zero signal in the conductor 140 becomes logically immaterial. The one signal from the NOR gate 134 is transferred back to the NOR gate 126 to hold same in the zero output condition. The zero output is connected through the conductor 127 to the NOR gate 142 but is of no consequence logically because the negative slope Schmitt trigger 25 is connected by way of the conductor 154 to provide an additional input for the NOR gate 142 so that the output of the NOR gate 142 is unaltered when the analytical wave form changes from zero slope to negative slope. The NOR gates 128 and 150 continue to operate without change when the analytical wave form slope is varied to negative slope although it may be appreciated that the conductor 153 transfers the NOR gate 126 output to the NOR gate 150. The signal in the conductor 153 is without effect on the operation of the NOR gate 150 due to the fact that the conductor 148 continues to maintain a one level signal on that NOR gate. Therefore, the voltage level at the output terminal 129 is unaltered when the slope of the analytical curve becomes negative.

After conclusion of the analytical wave form which generally resembles a voltage fluctuation above the base line value of the signal input to the base line drift corrector of this invention, the signal returns to the base line value and the slope sensing means of this invention returns the terminal 113 to its quiescent voltage. The quiescent voltage at the terminal 113 operates the negative slope Schmitt trigger 25 to form a zero signal in the output conductors 131 and 154 connected to that circuit. The zero signal in the conductor 131 is logically immaterial to the NOR gate 126 because of the one signal maintained thereon by the conductor 136. The one signal at the input of the NOR gate 126 maintains the output of that gate at the zero level which is sensed in the conductor 127 communicating the NOR gate 142. The termination of the binary one signal from the Schmitt trigger 25 in the conductor 154 operates through the NOR gate 142 to form a one signal in the conductor 143 which is connected to the NOR gate 128. The NOR gate 128 operates in response to this one signal to form a zero signal at the output terminal 129. The zero signal at the output terminal 129 is transferred by the conductor 148 to the input of the NOR gate 150 and the other input of that NOR gate supplied by the conductor 153 is the zero signal output of the NOR gate 126 to enable operation of the NOR gate 150 to the binary one level. The one signal of the NOR gate 150 is transferred by the conductor 151 back to the NOR gate 128 as an additional one input for holding the output at the terminal 129 at zero. It is to be noted that all of the logical circuitry of the peak recognition means has been returned to the initial conditions associated with a base line signal at the input terminal 15 of the base line drift corrector of this invention absent voltage fluctuations representing analytical information. Further, the output terminal 129 was operated by the peak recognition means to the one level when the peak recognition means sense the presence of positive slope, zero slope and negative slope for voltage fluctuations extending above the base line. This signal at the terminal 129 thus provides a peak recognition signal for further utilization by the circuitry of this invention.

Referring to FIG. 1, the output of the converter 16 is connected by a conductor 164 to a circuit designated as the servo driver 28. Briefly, the circuit 28 which is illustrated in detail in FIG. 3A compares the output of the converter 16 communicated through the conductor 164 to a predetermined value and drives the servo 30 to form correction signals which are input to the converter 16. The peak recognition means 26 forms the signal indicating the occurrence of analytical information as described in the foregoing paragraphs and such signal is communicated to the servo driver circuitry 28 to hold the correction signal during the occurrence of analytical information. The circuitry of the servo driver 28 is illustrated in FIG. 3A as including an input connected to the conductor 164 for applying the pulses from the converter 16 to a transistor 165 through a coupling capacitor 166. The transistor 165 cooperates with an additional transistor 175 to operate as a monostable flip-flop providing an output pulse of 1/12 of a second duration on occurrence of each pulse applied by the converter 16. The preferred embodiment of the flip-flop, including the transistors 165 and 175, utilizes a bias resistor 167 connected to a negative voltage supply line 168 to bias the transistor 165 on. The transistor also has a collector load resistor 169 connected to the conductor 168 and has for its emitter impedance a Zener diode 170 having its cathode connected to ground. The Zener diode 170 in the emitter circuit of the transistor 165 operates to hold the emitter voltage a few volts below ground potential whereas the base resistor 167, which is returned to a more negative voltage, biases the PNP transistor on to cause current to flow through the collector load resistor 169. The flow of current through the resistor 169 places the collector of the transistor at a voltage higher than the negative supply voltage of the conductor 168 which is transferred by a series resistor 171 to the base of the transistor 175.

The base of the transistor 175 is returned to ground through a resistor 172 and it may be appreciated from a knowledge of the relative voltages that the base of the transistor 175 tends toward ground potential whereas the emitter of that transistor is connected to share the emitter voltage of the transistor 165 which is maintained a few volts below ground potential by the Zener diode 170 to thereby cut off the transistor 175. The transistor 175 uses a pair of series collector resistors 173 and 174 with the resistor 173 connected to the negative supply line 168. On occurrence of a positive going pulse output by the converter 16 and transferred by the conductor 164 to the transistor 165, the positive pulse is coupled to the capacitor 166 and places the base of the transistor 165 considerably above the minus 18 volts connected to the base. The positive going pulse stops conduction through the transistor 165 and the collector voltage of the transistor 165 is altered very nearly to the collector supply voltage. This collector voltage wave form is transferred by the resistor 171 to the transistor 175 as a negative pulse placing the base of the transistor 175 lower in voltage than the emitter of the transistor which causes the PNP transistor to conduct current through the series collector resistors 173 and 174. The collector circuitry of the transistor 175 forms a positive going pulse which is maintained for $\frac{1}{12}$ of a second for each input pulse supplied from the converter 16.

The output pulse of the monostable flip-flop is supplied to the base of a switching transistor 177 to cause current to flow through the transistor. The transistor 177 is a PNP transistor having its emitter connected to the negative supply voltage line 168 through a Zener diode 179 connected to provide an emitter voltage somewhat higher than the negative supply voltage. The collector is connected to a resistor 180 to charge a capacitor 181. A similar switching transistor 182 is connected to the monostable flip-flop through a capacitor 183 and is provided with a biasing voltage through a resistor 184 connected to the low voltage supply 168 through the Zener diode 179. The emitter of the switching transistor 182 is connected to ground through a Zener diode 185 and has a collector resistor 186 also connected to the capacitor 181 to charge that capacitor.

In the absence of a signal, the switching transistor 182 is normally supplied with a base to emitter bias voltage causing the transistor to conduct through the collector resistor 186 to thereby discharge the capacitor 181. On the other hand, the switching transistor 177 is normally off due to the fact that its base is connected to the series collector resistors 173 and 174 of the transistor 175 to obtain a base voltage negative with respect to the emitter of the NPN transistor 177 so that no current flows through the collector resistor 180 of the transistor. However, when a pulse is transmitted from the voltage-to-frequency converter 16 through the conductor 164 and the monostable flip-flop forms an output, the pulse is applied from the collector circuitry of the transistor 175 to the NPN transistor 177 as a positive going voltage on the base which turns the transistor 177 on to thereby increase the negative charge on the capacitor 181. The charging and discharging of the capacitor 181 is related to the operation of the monostable flip-flop including the transistors 165 and 175, and it may be appreciated that when the converter 16 supplies pulses at a very rapid rate, the monostable flip-flop is repeatedly triggered to operate for a high percentage of time which tends to place an excessively large negative charge on the capacitor 181. Therefore, the capacitor 181 is shunted by a Zener diode 190 which limits the voltage fluctuations of the capacitor.

The voltage of the capacitor 181 operates voltage comparison means utilizing a pair of pulse forming Schmitt trigger circuits having circuits values selected to recognize voltages on the capacitor 181 which deviate above or below the quiescent voltage on the capacitor. As related hereinabove, it is commonly desired to select a base line value which is near but not quite equal to zero voltage, and the preferred embodiment of this invention utilizes a base line value which is generally defined to be three pulses per second output by the voltage-to-frequency converter 16. Three pulses per second operate the monostable flip-flop of the servo driver 28 to form pulses for $\frac{3}{12}$ of one second so that the capacitor 181 is charged for $\frac{3}{12}$ of one second and is discharged the remaining $\frac{9}{12}$ of a second. Such conditions define the quiescent condition of the capacitor 181 so that neither of the Schmitt trigger circuits operable by the quiescent voltage on the capacitor 181 is triggered. More specifically, a diode 192 and an-other diode 193 provide connecting means for the Schmitt trigger circuits which are identified generally in FIG. 3a at 198 and 199. The diode 192 provides an input for the circuit 198 which has a pair of transistors 200 and 201 which share a common emitter resistor 203 connected through a diode 204 to ground. The transistor 200 has a collector resistor 205 connected to the voltage supply line 168 and forms an output voltage connected through pulse shaping circuitry means in communication with the base of the transistor 201. The transistor 201 includes a collector resistor 206 which is connected to the negative supply voltage in the conductor 168 and includes a directly coupled series output resistor 207.

Pulse shaping means operable between the voltages supplied by the Zener diodes 179 and 185 which are associated with the switching transistors 177 and 182 are included in the Schmitt trigger 198 which includes a clamping diode 208 and a series blocking capacitor 209. A pair of resistors 210 and 212 are shunted across the clamping diode 208 and the blocking capacitor 209, respectively, and the base of the transistor 201 is connected by a resistor 214 and series diode 216 to the Zener diode 185 to provide a high base voltage for the PNP transistors 201 to maintain the transistor in the cutoff quiescent state.

The Schmitt trigger 199 is identical in circuit configuration to the Schmitt trigger 198 and the components thereof are identified by primed reference designators. The Schmitt trigger 199 is operated by signals supplied from the diode 193 and triggers on at a value less than quiescent voltage across the capacitor 181 as dictated by the choice of component values in the Schmitt trigger 199 whereas the Schmitt trigger 198 triggers on voltages above the quiescent voltage of the capacitor 181. Thus, it may be appreciated that both the Schmitt triggers 198 and 199 are capable of providing output pulses signifying drift of the base line of the analytical signal input to the terminal 15 as detected by the voltage comparison means including the capacitor 181 and the trigger levels dictated by the components of the Schmitt triggers 198 and 199.

Figure 3B:
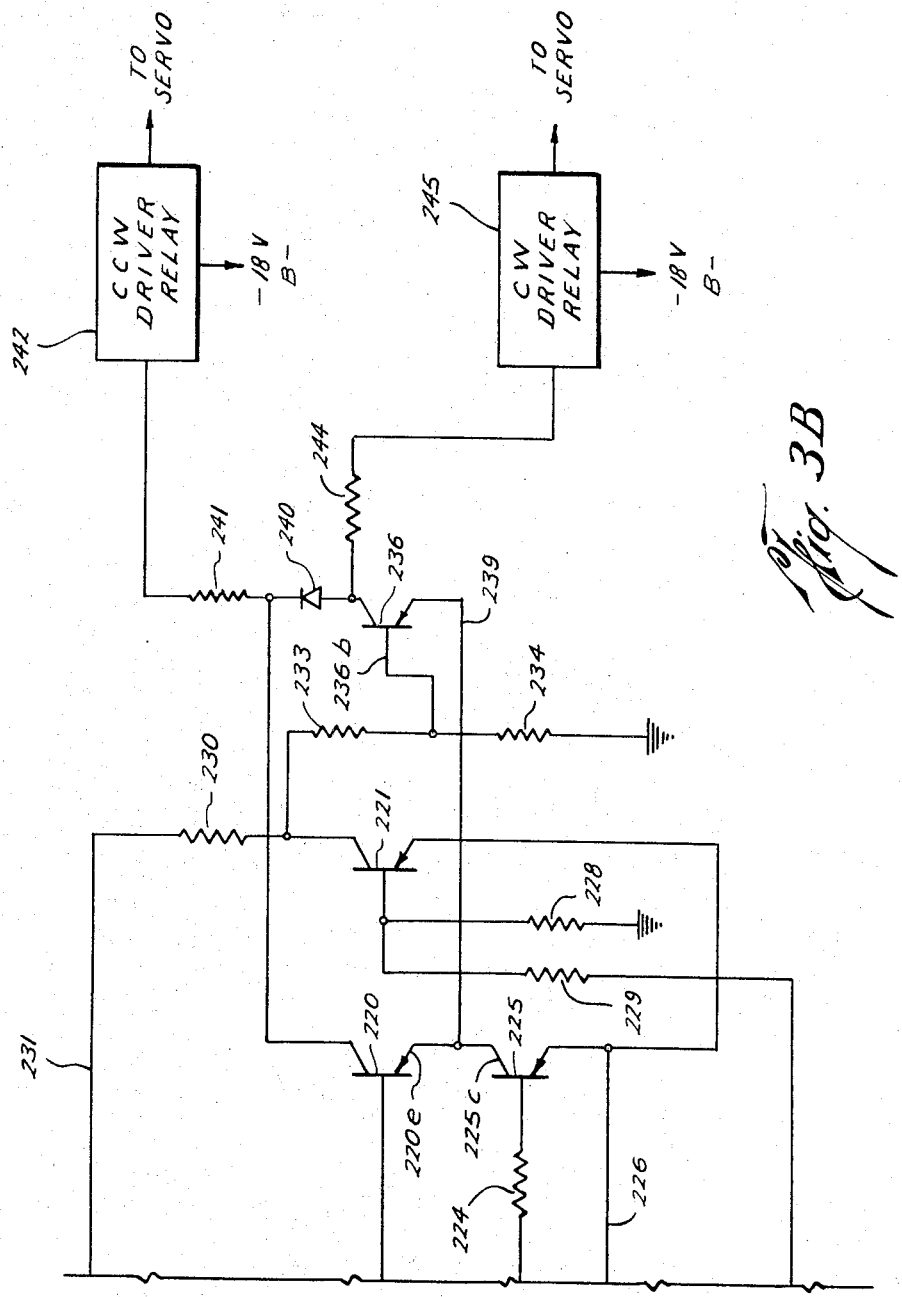
FIG. 3 (3A, 3B) is a schematic diagram of a servo driver circuit.

As illustrated in FIG. 3B of the drawings, the output of the Schmitt trigger 198 is connected as the input of the transistor 220 while the output of the Schmitt trigger 199 is connected to the base of a transistor 221. The driving pulses provided by the Schmitt trigger circuits are used to operate the servo 30 to provide clockwise or counterclockwise rotation when the voltage comparison means including the capacitor 181 indicates drift in the base line and when the peak recognition means 26 indicate the nonoccurrence of analytical voltages forming a voltage peak. The peak recognition circuit 26 is connected as an input by a conductor 223 through a series resistor 224 and a transistor 225 having its emitter and collector connected to control operation of the transistors 220 and 236. Specifically, the transistor 225 is connected through a conductor 226 to provide an emitter voltage three or four volts below ground from the Zener diode 185. The base of the transistor 221 is returned to ground through a resistor 228, and the input signals supplied by the Schmitt trigger 199 are conducted through a resistor 229. The transistor 221 includes a collector resistor 230 and a conductor 231 connected to the voltage supplied by the Zener diode 179 and signals from the collector of the transistor 221 are connected to ground through a divider including the resistors 233 and 234.

A transistor 236 having a base 236b connected to the mid-point of the resistive divider formed of resistors 233 and 234 is connected by a conductor 239 to the emitter 220e of the transistor 220 and the collector 225c of the switching transistor 225. The collector of the transistor 220 is connected to the collector circuitry of the transistor 236 with a diode 240 interposed therebetween, and a series resistor 241 provides an output for an operate (counterclockwise) driver relay 242. The collector of the transistor 236 is connected through a resistor 244 to a reverse (clockwise) driver relay 245 and through the diode 240 to the operate relay 242, and it may be appreciated that relays 242 and 245 provide negative collector voltages for the PNP transistors on operation and provide driving signals for the servo 30 which is turned off or on for rotation in the respective directions selected by the relays 242 and 245.

In operation, a peak recognition signal about zero voltage in the conductor 223 corresponding to a logical one signal level on the terminal 129 from the peak recognition means 26 is applied to the base of the transistor 225 to bias the base of the transistor 225 positive with respect to the emitter which is held at a relatively steady voltage by the conductor 226 which is connected to the Zener diode 185 communicating with ground thus turning the PNP transistor 225 off. Turning the transistor 225 off deprives the transistors 220 and 236 of emitter connections communicating with a voltage positive with respect to their collectors so that such operation limits current flow through both transistors. On occurrence of a logical zero on terminal 129 of the peak recognition means, the switching transistor 225 conducts current to provide an emitter voltage for the transistor 220 to enable the transistor to respond to a pulse from the Schmitt trigger 198. In quiescent conditions, the transistor 221 conducts because the Schmitt trigger 199 is on, resulting from the voltage on the capacitor; but the output signal of the transistor 221 is inverted to cut off the transistor 236.

When the Schmitt trigger 198 senses the voltage across the capacitor 181 on the high side of the quiescent value, the Schmitt trigger 198 operates to provide a negative going pulse to the base of the transistor 220 to switch the transistor on to draw current through the collector resistor 241. Current flow through the resistor 241 operates the driver relay 242 thereby rotating the servo 30 in the counterclockwise direction to readjust the error correction signal generating means indicated at 32 for injecting a correction current into the converter 16 to alter the base line of the analytical wave form.

When the Schmitt trigger 199 switches off and provides an output pulse signifying the presence of a voltage on the capacitor 181 on the lower side of the quiescent charge of the capacitor relative to the value sensed by the Schmitt trigger 198, the transistor 221 is switched off by the positive going pulse output of the Schmitt trigger 199 connected to the resistor 229 to drive the collector voltage of transistor 221 more negative which is coupled through the resistor 233 to the base 236b of the transistor 236. Negative voltage applied to the base 236b of the transistor 236 turns the transistor on for conduction so that current flows through both resistors 241 and 244 connecting with the relays 242 and 245 respectively to operate the relays to rotate the servo motor 30 in the clockwise direction to thereby vary the error correction voltage current summed by the capacitor of the converter 16. By these means, the servo driver provides means for sensing the value of the base line of the signal and utilizes means for sensing drift of the base line value from a predetermined value. Correction signal generating means are provided responsive to the drift sensing means for correcting the base line to the predetermined value by way of operation of the error correction signal generating means 32.

The invention provides output pulses representing the input wave form with the corrected base line, but it may be appreciated that analog presentation is appropriate for various applications. Various systems utilizing analytical signals are compatible with analog signals, and the invention may be modified as it will be recognized by those skilled in the art that the analytical signal is converted to pulse form in the converter 16 but is returned to analog form in charging the capacitor 81. As a matter of fact, the Schmitt triggers 198 and 199 operate on a voltage comparison basis, and it may be appreciated that such Schmitt triggers may be made compatible with analog signals. Also, the device utilizes a servomotor and drivers which are either completely on or completely off whereas means for forming error correction signals are available which operate continuously rather than in pulsed fashion. One such means would be a D-C servo motor driven by a control system operating in response to a D-C voltage. An operable D-C voltage servo might be connected directly to the capacitor 181.

It may be appreciated that the automatic base line drift corrector circuit of this invention may be connected to function with sensors providing analytical signals on either side of zero voltage. Also, the automatic base line drift corrector circuit functions to provide drift correction within preselected ranges of drift extending on both sides of zero potential.

The various switches such as switches 48 and 98 control the high frequency characteristics and are adjustable for use with analytical signals having different frequency content. The system rejects noise and voltage spikes by the filtering means as well as power line voltage surges. The time constant of the differentiating means cooperates with the D-C gain and filtering characteristics to provide precise operation in response to an analytical signal.

What is claimed is:

1. An automatic base line drift corrector for correcting the base line of an analytical signal to make the base line drift-free comprising:
    (a) an input terminal for receiving an analytical input signal;
    (b) means for sensing the value of the base line of the analytical signal;
    (c) drift sensing means for sensing drift of the base line value from the drift-free value of the base line;
    (d) compensating means connected to the drift sensing means for correcting the base line value to the drift-free value of the base line;
    (e) indicating circuit means for indicating the occurrence of an analytical fluctuation in the analytical signal;
    (f) control means connected to said indicating circuit means for controlling operation of said compensating means when said indicating circuit means is indicating the occurrence of an analytical fluctuation in the analytical signal wherein the analytical fluctuation in the analytical signal is a voltage fluctuating above the base line value of the analytical signal;
    (g) means for preventing the compensating means from altering the characteristics of the analytical fluctuation of the analytical signal.

2. An automatic base line drift corrector for correcting the base line drift in an analytical signal having analytical voltage fluctuations comprising:
    (a) an input terminal for receiving the analytical signal;
    (b) slope sensing means connected to the input terminal for sensing the slope of the analytical signal;
    (c) circuit means connected to the slope sensing means for generating an output signal on occurrence of voltage fluctuations;
    (d) voltage comparison means for providing an output signal for comparison against a drift-free base line voltage;
    (e) correction signal generating means connected with the voltage comparison means output to form a correction signal for the analytical signal;
    (f) means for combining the correction signal with the analytical signal; and
    (g) means connected with the circuit means output signal and connected with the correction signal generating means for withholding a change in the correction signal when the analytical signal includes analytical fluctuations.

3. The invention of claim 2 wherein the slope sensing means is a dynamically loaded differentiating circuit.

4. The invention of claim 2 wherein the slope sensing means includes an RC differentiating circuit loaded by circuitry having a decreasing input impedance with increasing signal amplitude.

5. The invention of claim 2 wherein the voltage comparison means includes a capacitor charged by the analytical signal and trigger circuit means triggered by the charge on said capacitor.

6. The invention of claim 2 including a voltage supply and means connected with the voltage comparison means to form an output voltage derived from the voltage supply.

7. The invention of claim 2 wherein said means for combining the correction signal with the analytical signal includes:
 (a) a servo driving circuit;
 (b) a servo;
 (c) means connecting said servo driving circuit with said servo; and
 (d) a variable resistor connected to a voltage supply and having a movable contact connected to the servo.

8. The invention of claim 2 wherein the means for combining the correction signal with the analytical signal provides a high impedance input to the signals to be summed.

9. The invention of claim 2 wherein the said means connected with the circuit means recognizes signals from the slope sensing means signifying positive going slope, zero slope and then negative going slope.

10. The invention of claim 2 wherein:
 (a) the circuit means forms an output signal coinciding with the occurrence of analytical signals;
 (b) the correction signal generating means includes electronic means for forming a correction signal in response to the voltage comparison means; and
 (c) the output signal of said means connected with the circuit means is connected to the electronic means to prevent the changing of the correction signal.

11. A base line drift corrector circuit for correcting the base line value of an analytical signal comprising:
 (a) means for forming a correction signal;
 (b) means for correcting the analytical signal with the the correction signal; and
 (c) means operated by the analytical signal for withholding the changing of the output of said forming means during occurrence of analytical fluctuations in the analytical signal.

12. A base line drift correction circuit for use with an analytical signal comprising:
 (a) correction means for forming a correction signal;
 (b) sensing circuit means for detecting analytical fluctuations in the analytical signal;
 (c) means for correcting the analytical signal with the correction signal; and
 (d) means operated by the sensing circuit means for withholding the changing of the output of said correcting means when said sensing circuit means detects analytical fluctuations in the analytical signal.

13. An automatic base line drift corrector for correcting the base line value of an analytical signal to make the base line drift-free, comprising:
 (a) an input terminal connected to an analytical signal;
 (b) a voltage comparison means operable in response to the analytical signal at the input terminal for providing a comparison against a drift-free base line value;
 (c) circuit means operable by the analytical signal for generating an output signal on occurrence of a fluctuation in the analytical signal signifying analytical information;
 (d) correction signal generating means for forming a signal for correction of the base line value of the analytical signal dependent on the comparison of the voltage comparison means;
 (e) means for withholding a change in the correction signal during occurrence of analytical information; and
 (f) means for adding the correction signal to the analytical signal to correct drift in the base line of the analytical signal.

14. An automatic base line drift corrector for correcting the base line value of an analytical voltage to make the base line drift-free, comprising:
 (a) an input terminal for receiving an analytical voltage signal;
 (b) a voltage-to-frequency converter connected to the input terminal for forming analytical pulses having a frequency related to the amplitude of the analytical voltage signal;
 (c) sensing means connected to the converter for sensing the frequency of the analytical pulses and for providing a reference pulse frequency related to the drift-free amplitude of the base line voltage;
 (d) means connected with the sensing means for comparing the frequency of the analytical and reference pulses;
 (e) correction signal means for providing a correction signal for correcting the analytical voltage in response to operation of the comparing means;
 (f) means connected to the correction signal means for supplying the correction signal to the analytical voltage signal to correct the base line of the analytical voltage signal for drift; and
 (g) means for withholding any change in the correction signal during analytical voltage fluctuations in the analytical signal.

15. An automatic base line drift corrector comprising:
 (a) an input for receiving a fluctuating analytical voltage signal from a sensor;
 (b) an RC differentiating circuit connected to the input for detecting change in the slope of the analytical voltage fluctuation;
 (c) a dynamic loading means connected to the RC differentiating circuit for improving the dynamic operating characteristics of the RC differentiating circuit;
 (d) first and second trigger circuits connected to the dynamic loading means for forming a binary indication of the occurrence of positive and negative slope, respectively, in the analytical voltage fluctuation;
 (e) a peak recognition circuit connected to said first and second trigger circuits for forming a binary indication of the occurrence of an analytical voltage fluctuation when said peak recognition circuit receives binary signals indicating the sequence of positive, zero, and negative slope from the first and second trigger circuits;
 (f) a voltage-to-frequency converter connected to the input for converting the analytical voltage fluctuations received at the input into an output signal having a frequency proportional to the amplitude of the analytical voltage fluctuations;
 (g) a servo driver connected to the output signal of the voltage-to-frequency converter including detecting means for detecting drift in the base line value of the analytical voltage signal by comparing the frequency related to the base line value of the analytical voltage signal with the frequency related to the drift-free base line value of the analytical voltage signal;
 (h) means included in said servo driver for forming a correction signal when said detection means detects the presence of drift in the base line of the analytical voltage signal;
 (i) a servo connected to said servo driver for producing a correction voltage in response to the correction signal to correct the base line voltage of the analytical voltage signal;
 (j) means combining the correction voltage produced by the servo driver with the analytical voltage signal input of the voltage-to-frequency converter to produce a drift-free base line value in the output signal of the voltage-to-frequency converter; and
 (k) means connecting the peak recognition circuit with the servo driver for preventing correction of the analytical voltage signal during the occurrence of an analytical voltage fluctuation.

16. An automatic base line drift correction circuit comprising in combination:
    (a) means for receiving a fluctuating analytical voltage from a sensor;
    (b) means for forming a signal indicating the occurrence or nonoccurrence of a peak in the analytical voltage fluctuation;
    (c) means for automatically correcting the drift in the base line value of the fluctuating analytical voltage; and
    (d) means for preventing automatic correction of the base line drift when said means for forming a signal indicates the occurrence of a peak in the fluctuating analytical voltage.

17. The automatic base line drift correction circuit of claim 16 wherein:
    (a) said means for forming a signal includes means for detecting change in the slope of the analytical voltage fluctuation; and
    (b) said means for automatically correcting the drift includes means for comparing the base line value of the analytical signal with a fixed reference value.

References Cited

UNITED STATES PATENTS

| | | | |
|---|---|---|---|
| 2,846,586 | 8/1958 | Jernakoff | 330—9 X |
| 3,070,786 | 12/1962 | MacIntyre | 340—347 |
| 3,177,482 | 4/1965 | Chase | 340—347 |
| 3,185,820 | 5/1965 | Williams et al. | |
| 3,228,025 | 1/1966 | Welch | 340—347 |
| 3,228,230 | 1/1966 | Thiele | 235—151.35 |
| 3,230,358 | 1/1966 | Davis et al. | 235—183 |

MALCOLM A. MORRISON, *Primary Examiner.*

T. J. PAINTER, *Assistant Examiner.*